C. MANCEL.
Apparatus for Illustrating the Earth's Axial Rotation
No. 196,239. Patented Oct. 16, 1877.
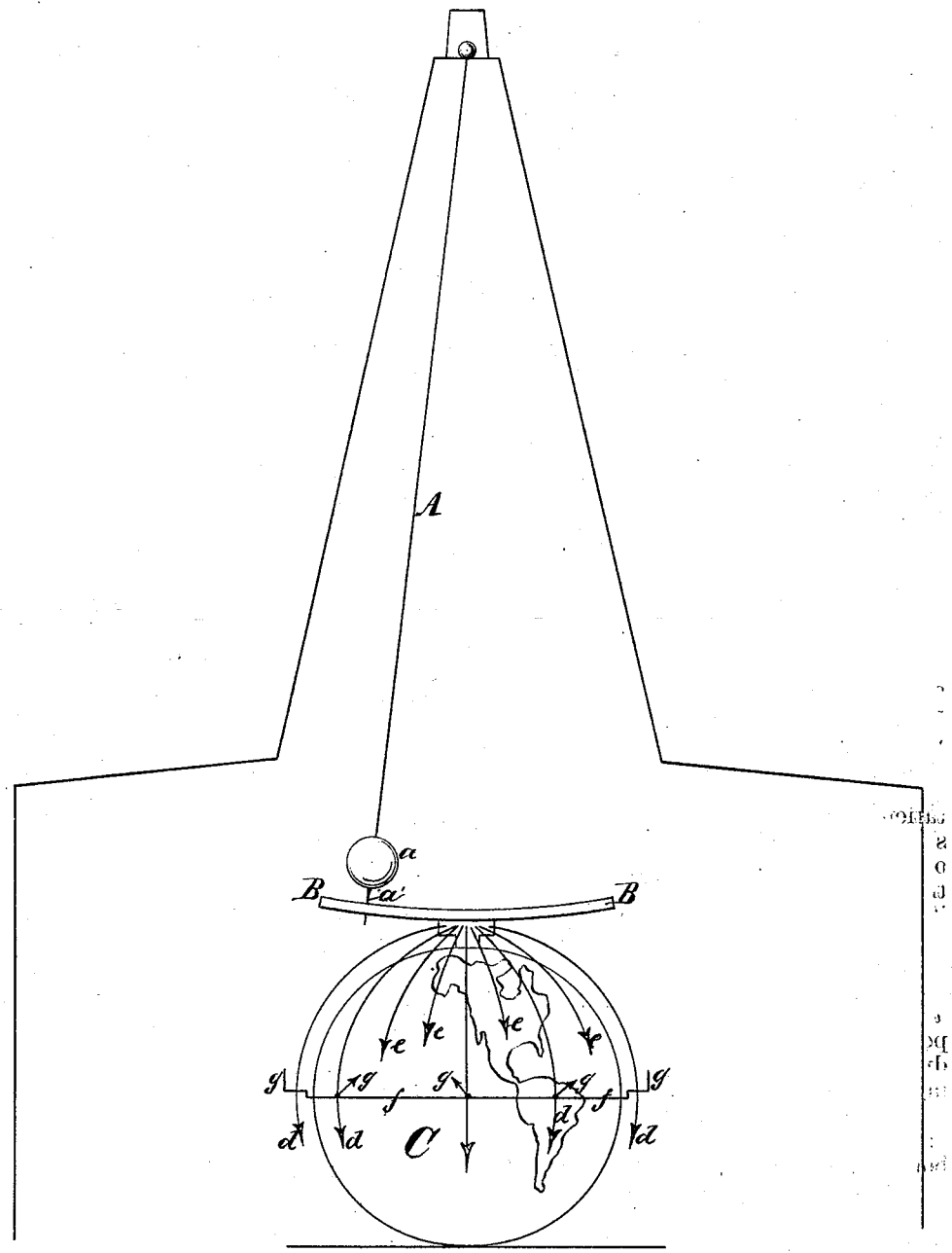

UNITED STATES PATENT OFFICE.

CHARLES MANCEL, OF NEW YORK, N. Y.

IMPROVEMENT IN APPARATUS FOR ILLUSTRATING THE EARTH'S AXIAL ROTATION.

Specification forming part of Letters Patent No. 196,239, dated October 16, 1877; application filed May 8, 1877.

*To all whom it may concern:*

Be it known that I, CHARLES MANCEL, of the city, county, and State of New York, have made a new and useful invention in Apparatus for Illustrating and Exhibiting to the Eye the Rotation of the Earth upon its Axis, of which the following is a description, reference being had to the accompanying drawing, making part of this specification.

My invention is founded upon one of the properties of the pendulum—viz., that when put into a state of vibration (under proper conditions) it will continue to perform its oscillations in the same vertical plane so long as its oscillations are continued; and the nature of my invention consists in applying, combining, and arranging the oscillations of the pendulum with an artificial globe or map representing the earth's surface, and with certain indicators or pointers arranged upon the face of the globe or map, in such a manner that while the indicators are held stationary by the vibration of the pendulum in the same vertical plane, and not partaking of the earth's rotation, the globe or map partakes of that rotation, and thus the indicators are made to show to the eye of the observer the progress of the earth's rotation, and may also measure the distance traveled by the earth's surface in its rotation during hours, minutes, or seconds.

The construction of my invention and apparatus is as follows:

In the accompanying drawing, A represents a pendulum, which must be suspended at a point or center of suspension about two hundred feet above the bob or weight $a$, in a building or tower suitable for the purpose.

B represents a frame, in the form of the arc or curve described by the oscillation of the bob of the pendulum. In this frame there is a slot or groove, and it must extend so far longitudinally through the frame as to allow the end of the pendulum-rod $a$, which projects through the bob to vibrate through its whole length. This frame, which I call the "supporter," stands upon the north pole or central point of the globe C, placed directly under it, and the frame is connected with the globe by a vertical pivot-joint, which permits the free motion or rotation of the globe independently of the supporter or frame, which is prevented from turning or rotating by the pendulum, as hereinafter set forth.

From the frame B or supporter are suspended arms or indicators $d\ d\ e\ e$, some of which extend over the globe to points below the equatorial line, as shown at $d\ d$, and others extending to points above the equatorial line, as shown at $e\ e$.

The lower ends of the indicators may be made to point to any desired locality upon the earth's surface, as represented by the globe.

It is obvious that, when the pendulum performs (as it must) its oscillations always in the same vertical plane, the indicators $d\ e$, fixed to the supporter B, must remain fixed and unmoved, and not partaking of the rotation of the earth, because the supporter is held in the same plane always as that of the oscillation of the pendulum by the point $a'$ vibrating in the slot of the supporter; but as the earth rotates from west to east, the indicators, not partaking of the rotation, must constantly mark or show an increasing distance from any locality taken as a starting-point from east to west, thus exhibiting visibly the earth's rotation upon its axis.

The globe or map and the tower and the spectators all move with the velocity of the earth's rotation from west to east; but the indicators, remaining stationary, appear to move from east to west.

To further carry out my invention, I place upon the equatorial line of the globe the ring $f$, which is provided with teeth forming a rack.

The longer indicators $d\ d$ are provided with hands or pointers $g\ g$. These pointers are hinged to the indicators $d\ d$ opposite to the equatorial ring, and have pinion-wheels, which gear into the rack $f$, so that when the ring or rack revolves with the earth's rotation these pointers revolve upon their axes or centers of motion, and their revolutions, being made to be performed within certain fixed times, will show the distance traveled by the surface of the earth in its rotation within such fixed times.

Thus, by my invention the rotation of the earth is made visible to the eye at any desired locality on the globe, and the distance run by the earth's surface is measured by the pointers, visible to the eye of the spectator.

What I claim herein as my invention, and desire to secure by Letters Patent, is—

1. The combination of the pendulum with the slotted frame or supporter B, and a globe or map representing the surface of the earth, constructed and arranged to operate substantially as set forth.

2. The combination of the pendulum, the supporter B, and the globe or map with the indicators $d$ $e$, constructed and arranged to operate substantially as set forth.

3. The combination of the pendulum, the supporter B, the indicators $d$, and the ring or rack $f$, with the pinions and hands or pointers $g$, constructed, arranged, and operating substantially as set forth.

CHARLES MANCEL.

Witnesses:
JAMES RIDGWAY,
WILLIAM FRAZEE.